(12) United States Patent
Wollmershauser et al.

(10) Patent No.: US 8,824,694 B2
(45) Date of Patent: Sep. 2, 2014

(54) APPARATUS AND METHOD FOR MANAGING CALL QUALITY

(75) Inventors: Steven M. Wollmershauser, San Antonio, TX (US); William O. Sprague, Jr., Wimberley, TX (US); Emlyn C. Jeffrey, San Antonio, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1667 days.

(21) Appl. No.: 11/858,975

(22) Filed: Sep. 21, 2007

(65) Prior Publication Data

US 2009/0080667 A1 Mar. 26, 2009

(51) Int. Cl.
| | |
|---|---|
| *H03B 29/00* | (2006.01) |
| *H04B 1/38* | (2006.01) |
| *H03G 3/20* | (2006.01) |
| *G10K 11/178* | (2006.01) |
| *H04M 1/60* | (2006.01) |
| *H04M 1/253* | (2006.01) |

(52) U.S. Cl.
CPC ........... *H04M 1/6016* (2013.01); *G10K 11/178* (2013.01); *H04M 1/2535* (2013.01); *G10K 2210/3033* (2013.01); *G10K 2210/1081* (2013.01); *G10K 2210/108* (2013.01)
USPC .............................. 381/71.1; 455/570; 381/57

(58) Field of Classification Search
CPC ............... G10K 2210/3033; G10K 2210/3048
USPC .............. 381/57, 71.1, 94.1, 94.2, 94.3, 94.7; 455/570
See application file for complete search history.

(56) References Cited

U.S. PATENT DOCUMENTS

| | | | | |
|---|---|---|---|---|
| 6,259,792 | B1 * | 7/2001 | Lambrecht | 381/73.1 |
| 6,285,891 | B1 * | 9/2001 | Hoshino | 455/567 |
| 6,825,786 | B1 * | 11/2004 | MacDonald et al. | 341/144 |
| 7,706,547 | B2 * | 4/2010 | Luo et al. | 381/71.8 |
| 7,742,746 | B2 * | 6/2010 | Xiang et al. | 455/63.1 |
| 2002/0099538 | A1 * | 7/2002 | Saito | 704/205 |

* cited by examiner

*Primary Examiner* — Duc Nguyen
*Assistant Examiner* — Kile Blair
(74) *Attorney, Agent, or Firm* — Guntin & Gust, PLC; Jay H. Anderson

(57) ABSTRACT

A system that incorporates teachings of the present disclosure may include, for example, a communication device having a controller to monitor ambient noise in proximity to the communication device, monitor a transmitted voice signal associated with the communication device, adjust a receiver volume for the transmitted voice signal based at least in part on a comparison of the transmitted voice signal with the ambient noise, monitor a received voice signal associated with the communication device, and adjust a speaker volume for the received voice signal based at least in part on a comparison of the received voice signal with the ambient noise, where the adjusting of the receiver volume is independent of the adjusting of the speaker volume. Other embodiments are disclosed.

21 Claims, 5 Drawing Sheets

216

APPARATUS AND METHOD FOR MANAGING CALL QUALITY

FIELD OF THE DISCLOSURE

The present disclosure relates generally to communication services and more specifically to an apparatus and method for managing call quality.

BACKGROUND

The use of mobile phones, such as cell phones, is rapidly increasing and expanding into new locations due in part to improved access technology. With improved access, cell phones are being used in all types of locations. However, such locations can create difficulty for the user to hear or speak with respect to the cell phone due to ambient or background noises and can diminish the quality of the call. Structural designs of cell phones to improve the user's experience such as through an ear-piece transmitter that can insulate against background sound waves (e.g., closely positioned against the user's ear) are cumbersome and undesirable to user's who are seeking small and easy to carry devices.

DETAILED DESCRIPTION

Figure 1:
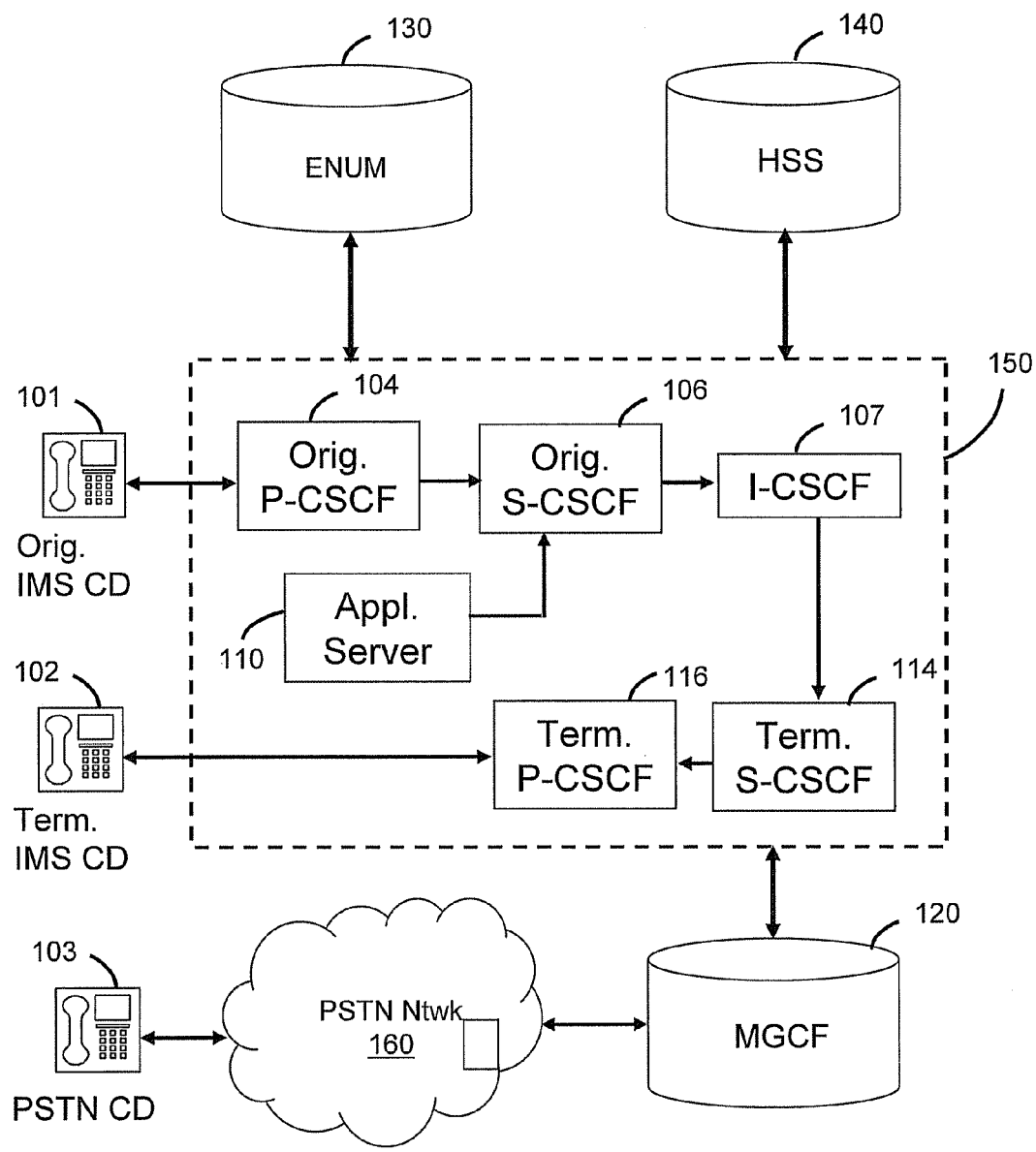
FIGS. 1-2 depict exemplary embodiments of communication systems.

In one embodiment of the present disclosure, a computer-readable storage medium can have computer instructions for monitoring ambient noise in proximity to a communication device, generating and emitting polarization reversed waveforms based at least in part on the ambient noise where the polarization reversed waveforms cancel at least a portion of the ambient noise, monitoring a transmitted voice signal associated with the communication device, adjusting a receiver volume for the transmitted voice signal based at least in part on a comparison of the transmitted voice signal with the ambient noise, monitoring a received voice signal associated with the communication device, and adjusting a speaker volume for the received voice signal based at least in part on a comparison of the received voice signal with the ambient noise.

In one embodiment of the present disclosure, a communication device can have a controller to monitor ambient noise in proximity to the communication device, monitor a transmitted voice signal associated with the communication device, adjust a receiver volume for the transmitted voice signal based at least in part on a comparison of the transmitted voice signal with the ambient noise, monitor a received voice signal associated with the communication device, and adjust a speaker volume for the received voice signal based at least in part on a comparison of the received voice signal with the ambient noise, where the adjusting of the receiver volume is independent of the adjusting of the speaker volume.

In one embodiment of the present disclosure, a communication device can have a controller to monitor ambient noise in proximity to the communication device, monitor a transmitted voice signal associated with the communication device, monitor a received voice signal associated with the communication device, present to a user noise control options comprising a noise cancellation and a volume adjustment, receive from the user a selection associated with the noise control options, adjust at least one of a receiver volume for the transmitted voice signal and a speaker volume for the received voice signal when the selection of the noise control options is the volume adjustment where the adjusting of the receiver volume is based at least in part on a comparison of the transmitted voice signal with the ambient noise and where the adjusting of the speaker volume is based at least in part on a comparison of the received voice signal with the ambient noise, and generate and emit polarization reversed waveforms when the selection of the noise control options is the noise cancellation where the polarization reversed waveforms correspond to the ambient noise and cancel at least a portion of the ambient noise.

In one embodiment of the present disclosure, a processor can have a controller to monitor ambient noise in proximity to a communication device, monitor a transmitted voice signal associated with the communication device, adjust a receiver volume for the transmitted voice signal based at least in part on a comparison of the transmitted voice signal with the ambient noise, monitor a received voice signal associated with the communication device, adjust a speaker volume for the received voice signal based at least in part on a comparison of the received voice signal with the ambient noise where the adjusting of the receiver volume is independent of the adjusting of the speaker volume, and generate and emit polarization reversed waveforms corresponding to the ambient noise where the polarization reversed waveforms cancel at least a portion of the ambient noise.

In one embodiment of the present disclosure, a method can involve monitoring ambient noise in proximity to a communication device using a microphone connected to the communication device, monitoring a transmitted voice signal associated with the communication device, adjusting a receiver volume for the transmitted voice signal based at least in part on a comparison of the transmitted voice signal with the ambient noise, monitoring a received voice signal associated with the communication device, and adjusting a speaker volume for the received voice signal based at least in part on a comparison of the received voice signal with the ambient noise, where the adjusting of the receiver volume is independent of the adjusting of the speaker volume.

FIG. 1 depicts an exemplary embodiment of a communication system 100 employing an IP Multimedia Subsystem (IMS) network architecture. The communication 100 can comprise a Home Subscriber Server (HSS) 140, a tElephone NUmber Mapping (ENUM) server 130, and network elements of an IMS network 150. The IMS network 150 can be coupled to IMS compliant communication devices (CD) 101, 102 or a Public Switched Telephone Network (PSTN) CD 103 using a Media Gateway Control Function (MGCF) 120 that connects the call through a common PSTN network 160. CDs 101-103 can be fixed, mobile, wireless and/or wired devices.

IMS CDs 101, 102 can register with the IMS network 150 by contacting a Proxy Call Session Control Function (P-CSCF) which communicates with a corresponding Serving CSCF (S-CSCF) to register the CDs with an Authentication, Authorization and Accounting (AAA) support by the HSS 140. To accomplish a communication session between CDs, an originating IMS CD 101 can submit a SIP INVITE message to an originating P-CSCF 104 which communicates with a corresponding originating S-CSCF 106. The originating S-CSCF 106 can submit the SIP INVITE message to an application server (AS) such as reference 110 that can provide a variety of services to IMS subscribers. For example, the application server 110 can be used to perform originating treatment functions on the calling party number received by the originating S-CSCF 106 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating SCSCF 106 can submit queries to the ENUM system 130 to translate an E.164 telephone number to a SIP Uniform Resource Identifier (URI) if the targeted communication device is IMS compliant. If the targeted communication device is a PSTN device, the ENUM system 130 will respond with an unsuccessful address resolution and the S-CSCF 106 will forward the call to the MGCF 120 via a Breakout Gateway Control Function (not shown).

When the ENUM server 130 returns a SIP URI, the SIP URI is used by an Interrogating CSCF (I-CSCF) 107 to submit a query to the HSS 140 to identify a terminating S-CSCF 114 associated with a terminating IMS CD such as reference 102. Once identified, the I-CSCF 107 can submit the SIP INVITE to the terminating S-CSCF 114 which can call on an application server similar to reference 110 to perform the originating treatment telephony functions described earlier. The terminating S-CSCF 114 can then identify a terminating P-CSCF 116 associated with the terminating CD 102. The P-CSCF 116 then signals the CD 102 to establish communications. The aforementioned process is symmetrical. Accordingly, the terms "originating" and "terminating" in FIG. 1 can be interchanged.

Figure 2:
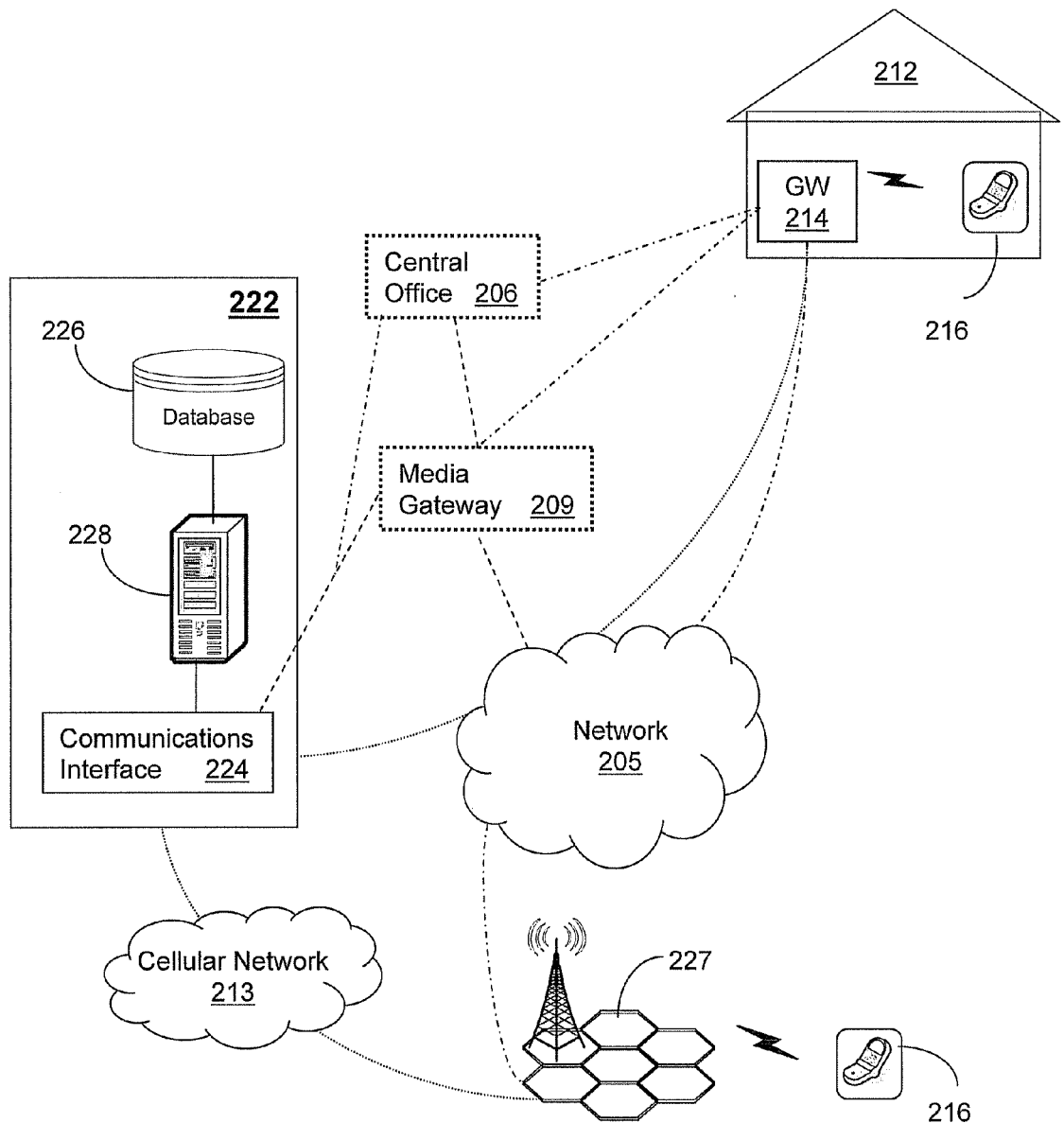

FIG. 2 depicts an exemplary embodiment of a communication system 200 employing communication devices 216 communicating by way of wireless access points (WAPs) and/or wired infrastructure with other communication devices and/or a network proxy or web server 222, which collectively operate in the communication system 200. Communication system 200 can be overlaid or operably coupled with communication systems 100 as another representative embodiment of the communication system.

The communication devices 216 can be multimedia devices for communicating video, voice and/or data. The communication devices 216 can be multimode communication devices that can communicate via a number of modes of communication, including wired and/or wireless communication. The communication system 200 can comprise a packet-switched network 205. The packet-switched network can be an Internet Service Provider (ISP) network 205. The network 205 can be coupled to the network proxy 222, the cellular network 213 and network elements located in one or more of the buildings 212 representing an enterprise or residence. The ISP network 205 utilizes technology for transporting Internet traffic.

In an enterprise setting, the building 212 can include a gateway 214 that provides voice, video, and/or data connectivity services between the communication devices 216. In a residential setting, the building 212 can include a gateway 214 represented by, for example, a residential gateway coupled to central office 206 utilizing conventional telephonic switching for processing calls with third parties.

The network proxy 222 can be used to control operations of a media gateway 209, the central office 206 and the gateway 214. Communications between the network proxy 222, the communication devices 216 and other network elements of the communication system 200 can conform to any number of signaling protocols such as a session initiation protocol (SIP), SS7, or a video communications protocol such as H.323 which combines video and voice over a packet-switched network, as well as cryptographic protocols, such as transport layer security (TLS) or secure sockets layer (SSL), to provide secure communications for data transfers.

The network proxy 222 can comprise a communications interface 224 that utilizes common technology for communicating over an IP interface with the network 205, the media gateway 209, the cellular network 213, and/or the gateway 214. By way of the communications interface 224, the network proxy 222 can direct by common means any of the foregoing network elements to establish packet switched data, voice, and/or video connections between communication devices 216 distributed throughout the communication system 200. The network proxy 222 can further comprise a memory 226 (such as a high capacity storage medium) embodied in this illustration as a database, and a controller 228 that makes use of computing technology such as a desktop computer, or scalable server for controlling operations of the network proxy 222. The network proxy 222 can operate as an IP Multimedia Subsystem (IMS) conforming in part to protocols defined by standards bodies such as 3GPP (Third Generation Partnership Protocol).

Under the control of the network proxy 222, the media gateway 209 can link packet-switched and circuit-switched technologies such as the cellular network 213 (or central office 206) and the network 205, such as an ISP network. The media gateway 209 can conform to a media gateway control protocol (MGCP) also known as H.248 defined by work groups in the Internet Engineering Task Force (IETF). This protocol can handle signaling and session management needed during a multimedia conference. The protocol defines a means of communication that converts data from the format required for a circuit-switched network to that required for a packet-switched network. MGCP can therefore be used to set up, maintain, and terminate calls between multiple disparate network elements of the communication system 200. The media gateway 209 can therefore support hybrid communication environments for the communication devices 216, including VoIP terminals.

The central office 206 can house common network switching equipment for distributing local and long-distance telecommunication services supplied by network 205 to buildings 212 (such as dwellings or commercial enterprises). Telecommunication services of the central office 206 can include traditional POTS (Plain Old Telephone Service) and broadband services such as HDTV, DSL, VoIP (Voice over Internet Protocol), IPTV (Internet Protocol Television), Internet services, and so on. The communication system 200 can utilize common computing and communications technologies to support circuit-switched and/or packet-switched communications.

The cellular network 213 can support voice and data services over a number of access technologies such as GSM-GPRS, EDGE, CDMA-1X, UMTS, WiMAX, software defined radio (SDR), and other known and future technologies. The cellular network 213 can be coupled to base stations 227 under a frequency-reuse plan for communicating over-the-air with other communication devices 216 of the communication system.

Figure 3:
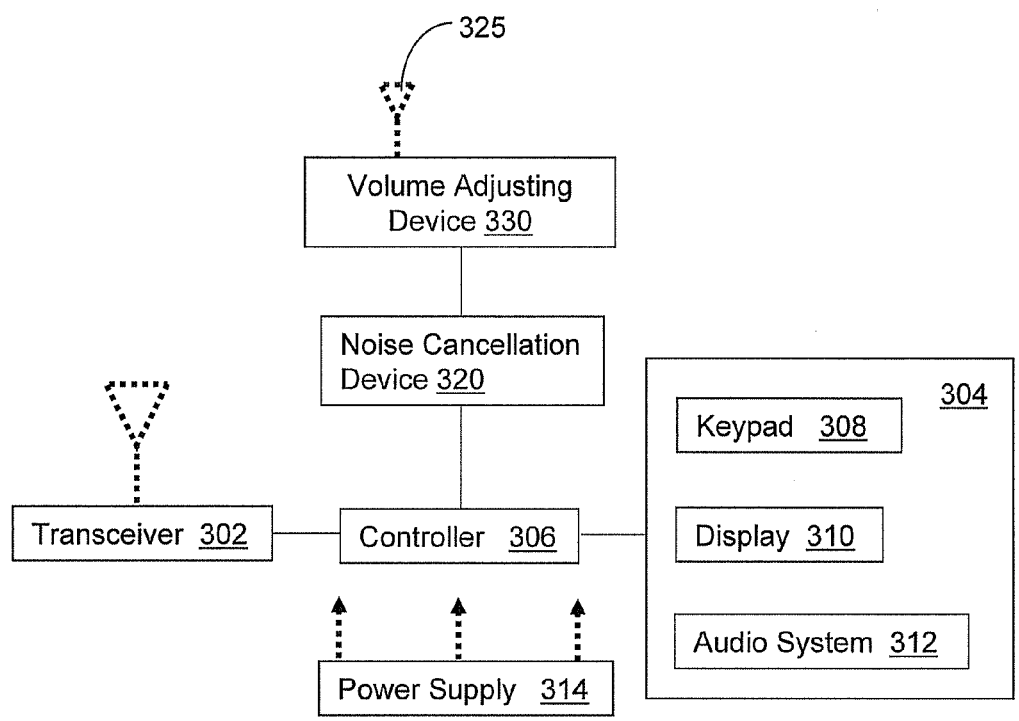
FIG. 3 depicts an exemplary block diagram of one of several embodiments for a communication device operating in the systems of FIGS. 1 and 2.

FIG. 3 depicts an exemplary embodiment of the communication device 216. The communication device 216 can comprise a transceiver 302, a user interface (UI) 304, a power supply 314, and a controller 306 for managing operations thereof. The transceiver 302 can utilize common technologies to support singly or in combination any number of wireless access technologies including without limitation cordless phone technology (e.g., DECT), Bluetooth™, Wireless Fidelity (WiFi), Worldwide Interoperability for Microwave Access (WiMAX), Ultra Wide Band (UWB), software defined radio (SDR), and cellular access technologies such as CDMA-1X, W-CDMA/HSDPA, UMTS, GSM/GPRS, TDMA/EDGE, and EVDO. SDR can be utilized for accessing a public or private communication spectrum according to any number of communication protocols that can be dynamically downloaded over-the-air to the communication device 216. It should be noted also that next generation wireless access technologies can be applied to the present disclosure. In one embodiment, the communication device 216 can be a wireline device.

The UI 304 can include a keypad 308 with depressible or touch sensitive navigation disk and keys for manipulating operations of the communication device 216. The UI 304 can further include a display 310 such as monochrome or color LCD (Liquid Crystal Display) for conveying images to the end user of the communication device 216, and an audio system 312 that utilizes common audio technology for conveying and intercepting audible signals of the end user.

The power supply 314 can utilize common power management technologies such as replaceable batteries, supply regulation technologies, and charging system technologies for supplying energy to the components of the communication device 216 and to facilitate portable applications. In stationary applications, the power supply 314 can be modified so as to extract energy from a common wall outlet and thereby supply DC power to the components of the communication device 216. The controller 306 can utilize computing technologies such as a microprocessor and/or digital signal processor (DSP) with associated storage memory such a Flash, ROM, RAM, SRAM, DRAM or other like technologies for controlling operations of the aforementioned components of the communication device 216.

The communication device 216 can include a noise cancellation device 320. The device 320 can be incorporated into the controller 306 or can be a separate device, such as a modular component that can be removably coupled with the communication device 216. The noise cancellation device 320 can have various components and configurations for providing noise cancellation, such as amplifiers, integrators, attenuators, A/D converters, and filters. The noise cancellation device 320 can generate a signal that is emitted by the audio system 312 as a sound wave with the same or similar amplitude but the opposite polarity (e.g., in antiphase) to the ambient noise. The generated sound wave and the ambient noise can combine through interference to form a new wave, and effectively cancel each other out (e.g., phase cancellation) or cancel a portion of the ambient noise out. The generated sound wave can be based upon typical ambient noise conditions associated with use of communication devices such as land line POTS service, VoIP, and Cellular Phones.

In one embodiment, the noise cancellation device 320 can have one or more speakers located at various positions along the communication device 216 to cancel or otherwise reduce the ambient noise. For example, the speaker can be positioned in proximity to the ear-piece speaker of the audio system 312 for cancelling out ambient noise with respect to the received voice signal. As another example, the speaker can be positioned in proximity to the mouth-piece receiver of the audio system 312 for cancelling out ambient noise with respect to the transmitted voice signal and/or the out of phase sound can be combined electrically in the speaker circuitry.

In another embodiment, the noise cancellation device 320 can monitor the ambient noise, such as through use of a microphone 325 positioned along the communication device, to generate sound waves to cancel the ambient noise. For example, a processor (e.g., controller 306) can analyze the waveform of the ambient noise received from the microphone 325 and then generate a polarization reversed waveform to cancel or reduce the ambient noise out by interference. This generated waveform can have a directly proportional amplitude to the waveform of the ambient noise, but with its polarity reversed. This creates destructive interference that can reduce the amplitude of the perceived ambient noise. Various techniques can be used for generating the sound wave, including comparison with the transmitted and/or received voice signals, transfer functions, and so forth.

The communication device 216 can have a volume adjustment device 330 for regulating the volume of one or both of the received voice signal and the transmitted voice signal. The device 330 can be incorporated into the controller 306 or can be a separate device, such as a modular component that can be removably coupled with the communication device 216. The volume adjustment device 330 can utilize ambient noise sampling, such as through use of the existing or a second microphone 325, to adjust the received and transmitted voice signals. In one embodiment, the volume adjustment device 330 can retrieve the ambient noise from the microphone 325 and compare it to the received voice signal at the ear-piece speaker of the audio system 312. The comparison can be based on the volumes of the ambient noise and the received voice signal, as well as other parameters, such as the frequency or amplitude of the noise and signals. The volume of the received voice signal at the ear-piece speaker of the audio system 312 can be adjusted based on the comparison. In another embodiment, the volume adjustment device 330 can retrieve the ambient noise from the microphone 325 and compare it to the transmitted voice signal at the mouth-piece receiver of the audio system 312. The comparison can be based on the volumes of the ambient noise and the transmitted voice signal, as well as other parameters, such as the frequency or amplitude of the noise and signals. The volume of the transmitted voice signal at the mouth-piece receiver of the audio system 312 can be adjusted based on the comparison.

Figure 4:
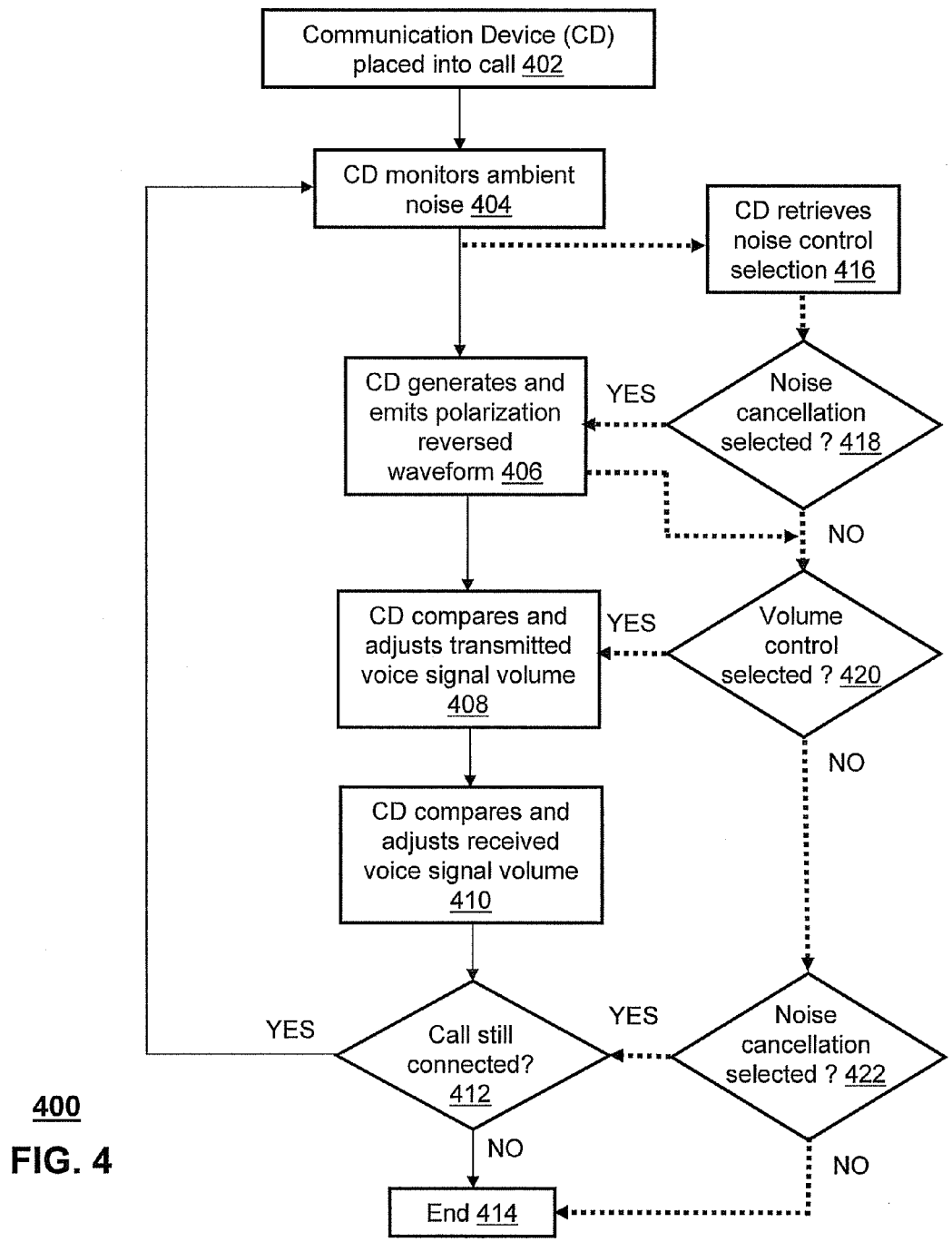
FIG. 4 depicts an exemplary method operating in portions of the communication systems.

FIG. 4 depicts an exemplary method 400 operating in portions of the communication systems 100-200. Method 400 has variants as depicted by the dashed lines. It would be apparent to an artisan with ordinary skill in the art that other embodiments not depicted in FIG. 4 are possible without departing from the scope of the claims described below. For convenience, reference to one or more features of communication system 200 as used in the following paragraphs can mean one or more features of the communication systems 100 and 200 singly or in combination, including communication devices 101, 102, 103 and 216.

Method 400 begins with step 402 in which the communication device 216 can place or receive a call. In step 404, the communication device 216 can monitor for or otherwise sample ambient noise, such as through use of the microphone 325. For example, the microphone 325 can be positioned along a rear side of a mobile phone so as to accurately detect ambient noise without any muffling from the user's ear or face. However, the present disclosure contemplates placing the microphone 325 in other positions, as well as using a plurality of microphones, such as in proximity to one or both of the ear-piece speaker and the mouth-piece receiver of the communication device 216.

In step 406, the communication device 216 can generate noise cancellation sound by emitting a polarization reversed waveform. As described above, the waveform can be based on expected ambient noise for a typical environment and/or can be generated based on the monitored ambient noise resulting in a polarization reversed waveform specific to the noise. In one embodiment, pre-determined waveforms can be selected from a group of waveforms stored by the communication device 216. For example, a communication device 216 can detect a particular environment and/or ambient noise type and then retrieve one or more waveforms from signals stored in the memory of the communication device that correspond to the detection. The signals can represent various types of ambient noises to be cancelled, such as a car engine, crowd noise at a sporting event, machinery in a factory, and so forth. In another embodiment, the user can input the particular environment and/or ambient noise that is being experienced, such as through a selection in a menu, and the communication device 216 can generate and emit the corresponding polarized reverse waveforms for that ambient noise or environment.

The present disclosure also contemplates the use of Voice Activity Detection (VAD) techniques, and the communication device 216 can have components for performing such techniques. The VAD techniques can vary and can include algorithms based on Itakura LPC distance measure, energy levels, timing, pitch, zero crossing rates, cepstral features, adaptive noise modeling of voice signals and the periodicity measure. Robust VAD techniques can also be used for voice detection. The VAD techniques can be applied for generating the one or more polarization reversed waveforms to be emitted to cancel the ambient noise.

In step 408, the communication device 216 can compare the monitored ambient noise with the transmitted voice signal and then adjust the volume of the transmitted voice signal (e.g., the volume of the mouth-piece receiver of audio system 312) based on the comparison. The comparison can be based on a number of factors, including volume, frequency, amplitude, and a combination thereof. In step 410, the communication device 216 can compare the monitored ambient noise with the received voice signal and then adjust the volume of the received voice signal (e.g., volume of the ear-piece speaker of audio system 312) based on the comparison. The comparison can be based on a number of factors, including volume, frequency, amplitude, and a combination thereof.

The communication device 216 can determine in step 412 if the call is still connected. If the call is no longer connected then method 400 can proceed to end the noise control process at step 414. If on the other hand, the call is still connected then method 400 can return to step 404 to monitor the ambient noise and to continue to implement the noise cancellation and volume control steps as described above. The rate at which method 500 proceeds can vary. For example, ambient noise monitoring can be done at a specified rate that effectively controls the ambient noise without draining too much power or without overloading the processor of the noise cancellation device 320 and/or the volume adjusting device 330.

In one embodiment, the communication device 216 can retrieve or otherwise obtain noise control selections associated with the communication device 216 and/or made by the user of the communication device, as in step 416. For example, the user can depress a dedicated button for activating one or both of the noise cancellation process and the volume control process. As another example, the selection for activating one or both of the noise cancellation process and the volume control process can be made in a menu and stored by the communication device 216. In step 418, the communication device 216 can determine if the noise cancellation process has been selected. If the noise cancellation process has been selected then method 400 can proceed to step 406 for generating and emitting the polarization reversed waveform and then proceed to step 420 to determine if the volume control process has been selected. If on the other hand, the noise cancellation process has not been selected then method 400 can proceed to step 420 to determine if the volume control process has been selected. If the volume control process has been selected then method 400 can proceed to steps 408 and 410 for the comparison of the monitored ambient noise with the transmitted and received voice signals, and any resulting adjustment of those signals. If on the other hand, the volume control process has not been selected then method 400 can proceed to step 422 to confirm whether the noise cancellation was selected and either end the process in step 414 or continue the process by determining if the call is still connected in step 412.

Upon reviewing the aforementioned embodiments, it would be evident to an artisan with ordinary skill in the art that said embodiments can be modified, reduced, or enhanced without departing from the scope and spirit of the claims described below. In one embodiment, the rate of sampling the ambient noise and adjusting one or more of the emitted polarization reversed waveforms, the transmitted voice signal volume and the received voice signal volume, can be varied based on a number of factors, including the volume, frequency, amplitude and/or rate of change of the ambient noise. For example, a communication device 216 being used in a busy city where ambient noise rapidly changes can have its rate of sampling and/or noise control adjustments higher than a communication device in an environment with a steady ambient noise. In another embodiment, the rate of sampling the ambient noise and adjusting one or more of the emitted polarization reversed waveforms, the transmitted voice signal volume and the received voice signal volume, can be varied during a call, such as based on changes to the ambient noise. The communication device 216 can also provide for separate adjustment of the transmitted voice signal volume and the received voice signal volume. The separate adjustment can be based on a selection by the user and/or a determination by the communication device 216 based on a number of factors, including power conservation and/or noise control effectiveness. For example, the communication device 216 can determine that the transmitted voice signal needs to be monitored and adjusted because it has a low volume as compared to the ambient noise, but that the received voice signal does not need to be monitored because of its much higher volume as compared to the ambient noise.

In one embodiment, the user can also cease any one of the noise control processes, such as during the call by depressing a dedicated noise control button on the communication device 216. The communication device 216 can also implement the continued monitoring of the ambient noise and one or more of the emitting of polarization reversed waveforms and adjusting the transmitted and received voice signal volumes based on a threshold for the ambient noise. For example, the communication device 216 can sample the ambient noise and then only implement the noise cancellation process without using the volume adjustments for the transmitted and received voice signals.

In one embodiment, the communication device can utilize feed back control with one or more of the emitting of polarization reversed waveforms and adjusting the transmitted and received voice signal volumes. The feedback control can use various components and techniques, including other microphones to provide reference ambient signals for additional comparison. Also, additional filtering can be added just out-side the voice band so the ears do not pick up as much background noise from the calling party. In another embodiment, the communication device can provide for adjustable anti-noise emission. For example, a timing filter can be provided that delays the waveforms according to a selection of different timing periods. For instance, a user can adjust the phase differential by adjusting the timing delay until a satisfactory reduction in ambient noise is achieved.

These are but a few examples of modifications that can be applied to the present disclosure without departing from the scope of the claims. Accordingly, the reader is directed to the claims section for a fuller understanding of the breadth and scope of the present disclosure.

Figure 5:
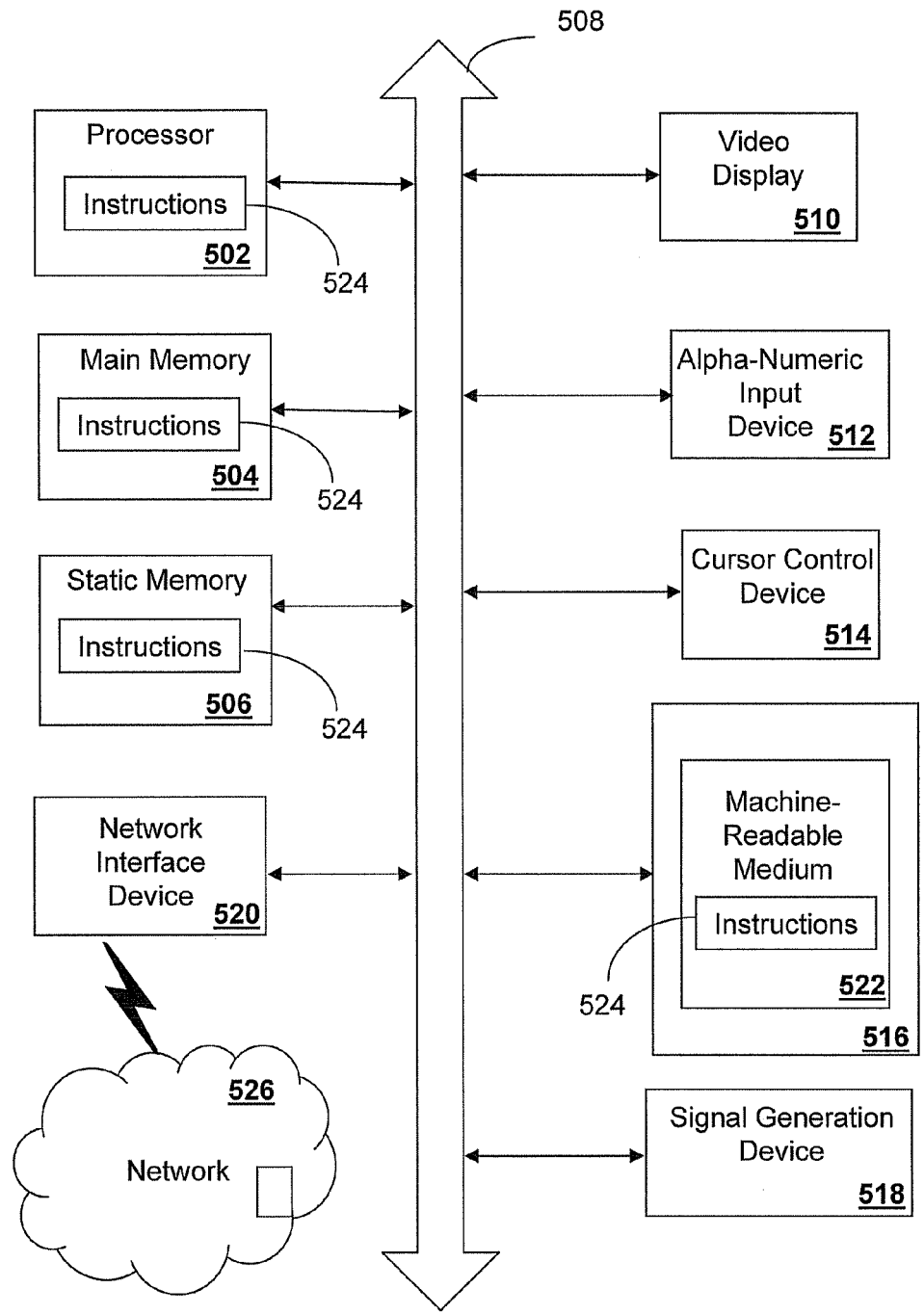
FIG. 5 is a diagrammatic representation of a machine in the form of a computer system within which a set of instructions, when executed, may cause the machine to perform any one or more of the methodologies discussed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a mass storage medium 516, a signal generation device 518 (e.g., a speaker or remote control) and a network interface device 520.

The mass storage medium 516 may include a computer-readable storage medium 522 on which is stored one or more sets of instructions (e.g., software 524) embodying any one or more of the methodologies or functions described herein, including those methods illustrated above. The computer-readable storage medium 522 can be an electromechanical medium such as a common disk drive, or a mass storage medium with no moving parts such as Flash or like non-volatile memories. The instructions 524 may also reside, completely or at least partially, within the main memory 504, the static memory 506, and/or within the processor 502 during execution thereof by the computer system 500. The main memory 504 and the processor 502 also may constitute computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the computer-readable storage medium 522 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a computer-readable storage medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium storing computer instructions that, when executed by one or more processors, cause the one or more processors to perform operations comprising:
   monitoring ambient noise in proximity to a communication device;
   generating and emitting polarization reversed waveforms based at least in part on a threshold for the ambient noise, wherein the polarization reversed waveforms are configured to cancel at least a portion of the ambient noise, and wherein the polarization reversed waveforms are selected from a group of pre-determined polarization reversed waveforms according to an environment type detected by the communication device;
   monitoring a transmitted audible voice signal at the communication device;
   adjusting a receiver volume for processing the transmitted audible voice signal based at least in part on the threshold for the ambient noise, and a comparison of the transmitted audible voice signal with the ambient noise;
   monitoring a received voice signal at the communication device;
   adjusting a speaker volume for audibly presenting the received voice signal based at least in part on the threshold for the ambient noise, and a comparison of the received voice signal with the ambient noise; and
   in response to a first user input, ceasing adjustment of the receiver volume and the speaker volume while continuing to monitor the ambient noise, and emitting the polarization reversed waveforms only when the ambient noise exceeds the threshold,
   wherein the transmitted voice signal and the received voice signal are automatically selectively monitored based on comparing the volume thereof with the ambient noise.

2. The non-transitory storage medium of claim 1, wherein signals stored in the communication device are representative of each waveform of the group of pre-determined polarization reversed waveforms.

3. The non-transitory storage medium of claim 1, comprising computer instructions that, when executed by the one or more processors, cause the one or more processors to perform operations comprising adjusting a rate of at least one of the generating and emitting of the polarization reversed waveforms, the adjusting of the receiver volume, or the adjusting of the speaker volume based at least in part on a change in the ambient noise.

4. The non-transitory storage medium of claim 1, comprising computer instructions that, when executed by the one or more processors, cause the one or more processors to perform operations comprising ceasing, in response to a second user input, during a communication session the generating and emitting of the polarization reversed waveforms.

5. A communication device, comprising:
   a memory; and
   a controller coupled to the memory, wherein the memory comprises computer instructions which when executed by the controller, cause the controller to:
   monitor ambient noise in proximity to the communication device;
   detect an ambient noise type;
   select polarization reversed waveforms from a group of stored polarization reversed waveforms according to the ambient noise type;
   emit the polarization reversed waveforms;
   monitor a transmitted audible voice signal at the communication device;
   adjust a receiver volume for processing the transmitted audible voice signal based at least in part on a threshold for the ambient noise, and a comparison of the transmitted audible voice signal with the ambient noise;
   monitor a received voice signal at the communication device;
   adjust a speaker volume for audibly presenting the received voice signal based at least in part on the threshold for the ambient noise and a comparison of the received voice signal with the ambient noise, wherein the adjusting of the receiver volume is independent of the adjusting of the speaker volume; and
   in response to a first user input, cease adjustment of the receiver volume and the speaker volume while continuing to monitor the ambient noise, and emit the polarization reversed waveforms only when the ambient noise exceeds the threshold,
   wherein the controller automatically selectively monitors the transmitted voice signal and the received voice signal based on comparing the volume thereof with the ambient noise.

6. The communication device of claim 5, wherein the group of stored polarization reversed waveforms comprise signals stored in the memory of the communication device.

7. The communication device of claim 6, wherein execution of the computer instructions causes the controller to:
receive an ambient noise signal from a microphone of the communication device; and
generate the polarization reversed waveforms based at least in part on the ambient noise signal and the detected ambient noise type.

8. The communication device of claim 7, wherein execution of the computer instructions causes the controller to adjust a rate of at least one of the generating and emitting of the polarization reversed waveforms, the adjusting of the receiver volume, or the adjusting of the speaker volume based at least in part on a change in the ambient noise.

9. The communication device of claim 7, wherein execution of the computer instructions causes the controller to cease, in response to a second user input, during a communication session the generating and emitting of the polarization reversed waveforms.

10. A communication device, comprising:
a memory; and
a controller coupled to the memory, wherein the memory comprises computer instructions which when executed by the controller, cause the controller to:
monitor ambient noise in proximity to the communication device;
monitor a transmitted audible voice signal associated at the communication device;
monitor a received voice signal at the communication device;
present noise control options comprising one or more selectable options of at least one of a noise cancellation or a volume adjustment;
receive a first selection associated with the noise control options;
adjust at least one of a receiver volume for processing the transmitted audible voice signal or a speaker volume for audibly presenting the received voice signal when the first selection associated with the noise control options is the volume adjustment, wherein the adjusting of the receiver volume is based at least in part on a threshold for the ambient noise, and a comparison of the transmitted audible voice signal with the ambient noise, wherein the adjusting of the speaker volume is based at least in part on the threshold for the ambient noise, and a comparison of the received voice signal with the ambient noise;
detect an environment type;
generate and emit polarization reversed waveforms when the first selection associated with the noise control options is the noise cancellation, wherein the polarization reverse waveforms are selected from pre-determined signals according to the detected environment type, and wherein the polarization reversed waveforms cancel at least a portion of the ambient noise; and
in response to a second selection, cease adjustment of the receiver volume and the speaker volume while continuing to monitor the ambient noise, and emit the polarization reversed waveforms only when the ambient noise exceeds the threshold,
wherein the transmitted voice signal and the received voice signal are automatically selectively monitored based on comparing the volume thereof with the ambient noise.

11. The communication device of claim 10, wherein execution of the computer instructions causes the controller to adjust a rate of at least one of the generating and emitting of the polarization reversed waveforms, the adjusting of the receiver volume, or the adjusting of the speaker volume based at least in part on a change in the ambient noise.

12. The communication device of claim 10, wherein execution of the computer instructions causes the controller to generate the polarization reversed waveforms based on a selection of a polarization reversed waveform from a group of polarization reversed waveforms, wherein the memory of the communication device stores signals representative of each of the group of polarization reversed waveforms.

13. The communication device of claim 12, wherein execution of the computer instructions causes the controller to:
recognize a group of environment types stored in the memory; and
detect the environment type according to a selection from the group of environment types.

14. The communication device of claim 10, wherein execution of the computer instructions causes the controller to:
receive an ambient noise signal from a microphone of the communication device, wherein the ambient noise signal is representative of the ambient noise being monitored; and
generate the polarization reversed waveforms based at least in part on the ambient noise signal and the detected environment type.

15. The communication device of claim 10, wherein execution of the computer instructions causes the controller to cease, in response to a third selection, during a communication session the generating and emitting of the polarization reversed waveforms.

16. A device, comprising:
a memory;
a controller coupled to the memory, wherein the memory comprises computer instructions which when executed by the controller, cause the controller to:
monitor ambient noise in proximity to a communication device;
monitor a transmitted audible voice signal at the communication device;
adjust a receiver volume for receiving the transmitted audible voice signal based at least in part on a threshold for the ambient noise, and a comparison of the transmitted voice signal with the ambient noise;
monitor a received voice signal at the communication device;
adjust a speaker volume for audibly presenting the received voice signal based at least in part on the threshold for the ambient noise, and a comparison of the received voice signal with the ambient noise, wherein the adjusting of the receiver volume is independent of the adjusting of the speaker volume;
detect an ambient noise type from the ambient noise;
retrieve polarization reversed waveforms from pre-determined stored signals according to the detected ambient noise type;
emit the polarization reversed waveforms for canceling at least a portion of the ambient noise; and
in response to a user input, cease adjustment of the receiver volume and the speaker volume while continuing to monitor the ambient noise, and emit the polarization reversed waveforms only when the ambient noise exceeds the threshold,
wherein the transmitted voice signal and the received voice signal are automatically selectively monitored based on comparing the volume thereof with the ambient noise.

17. The device of claim 16, wherein execution of the computer instructions causes the controller to adjust a rate of at least one of the emitting of the polarization reversed waveforms, the adjusting of the receiver volume, or the adjusting of the speaker volume based at least in part on a change in the ambient noise.

18. A method, comprising:
- monitoring ambient noise in proximity to a communication device using a microphone of the communication device;
- emitting from the communication device polarization reversed waveforms, wherein the polarization reversed waveforms are retrieved from a memory of the communication device according to an ambient noise type detected by the communication device without user input;
- monitoring a transmitted audible voice signal received by the communication device;
- adjusting at the communication device a receiver volume for processing the transmitted audible voice signal based at least in part on a threshold for the ambient noise, and a comparison of the transmitted voice signal with the ambient noise;
- monitoring a received voice signal at the communication device;
- adjusting at the communication device a speaker volume for audible presentation of the received voice signal based at least in part on the threshold for the ambient noise, and a comparison of the received voice signal with the ambient noise, wherein the adjusting of the receiver volume is independent of the adjusting of the speaker volume; and
- in response to a user input, ceasing adjustment of the receiver volume and the speaker volume while continuing to monitor the ambient noise, and emitting the polarization reversed waveforms only when the ambient noise exceeds the threshold,
- wherein the transmitted voice signal and the received voice signal are automatically selectively monitored based on comparing the volume thereof with the ambient noise.

19. The method of claim 18, wherein the emitting from the communication device of the polarization reversed waveforms is based at least in part on the ambient noise.

20. The method of claim 19, comprising generating the polarization reversed waveforms based on a selection of the polarization reversed waveform from a group of stored polarization reversed waveforms according to the ambient noise type.

21. The method of claim 19, comprising adjusting a phase differential associated with the retrieved polarization reversed waveforms using a time delay circuit, wherein the adjusting of the phase differential is based on a selection based on user input received by the communication device.

* * * * *